(12) United States Patent
Neathery et al.

(10) Patent No.: US 10,011,971 B1
(45) Date of Patent: Jul. 3, 2018

(54) MANHOLE INSERTS AND MANHOLE INSERT GASKET FABRICATION METHODS

(71) Applicants: David L. Neathery, Shreveport, LA (US); Robert D. Forlong, Tampa, FL (US)

(72) Inventors: David L. Neathery, Shreveport, LA (US); Robert D. Forlong, Tampa, FL (US)

( * ) Notice: Subject to any disclaimer, the term of this patent is extended or adjusted under 35 U.S.C. 154(b) by 161 days.

(21) Appl. No.: 14/798,546

(22) Filed: Jul. 14, 2015

(51) Int. Cl.
| | | |
|---|---|---|
| *E02D 29/14* | (2006.01) | |
| *B29C 33/38* | (2006.01) | |
| *B29C 39/02* | (2006.01) | |
| *B29K 75/00* | (2006.01) | |
| *B29L 31/26* | (2006.01) | |

(52) U.S. Cl.
CPC ........ *E02D 29/149* (2013.01); *B29C 33/3842* (2013.01); *B29C 39/028* (2013.01); *E02D 29/14* (2013.01); *B29K 2075/00* (2013.01); *B29K 2911/14* (2013.01); *B29K 2995/0058* (2013.01); *B29K 2995/0078* (2013.01); *B29K 2995/0082* (2013.01); *B29L 2031/265* (2013.01)

(58) Field of Classification Search
CPC ... E02D 29/149; E02D 29/14; B29C 33/3842; B29C 39/028; B29K 2075/00; B29L 2031/265; F16J 15/02; F16J 15/06
USPC ........... 29/897.3, 897.34, 458, 527.1, 527.2, 29/527.3, 402.02, 402.09, 402.18
See application file for complete search history.

(56) References Cited

U.S. PATENT DOCUMENTS

| | | | |
|---|---|---|---|
| 3,832,438 A | | 8/1974 | Ditcher |
| 3,980,311 A | | 9/1976 | Ditcher |
| 4,440,407 A | | 4/1984 | Gagas |
| 4,737,220 A | | 4/1988 | Ditcher et al. |
| 4,772,154 A | | 9/1988 | Caroulle |
| 4,919,564 A | * | 4/1990 | Neathery ............... E02D 29/14 277/648 |
| 4,934,715 A | | 6/1990 | Johnson |
| 4,957,389 A | | 9/1990 | Neathery |

FOREIGN PATENT DOCUMENTS

EP     0050928 A1 *  5/1982  ............. B22C 9/22

* cited by examiner

*Primary Examiner* — Jason L Vaughan
*Assistant Examiner* — Amanda Meneghini
(74) *Attorney, Agent, or Firm* — R. Keith Harrison

(57) ABSTRACT

Methods of fabricating a manhole insert gasket on a manhole insert flange of a manhole insert include fabricating a gasket mold, inverting a manhole insert having a manhole insert flange, placing the manhole insert on the gasket mold with a mold space overlying the manhole insert flange, preparing a gasket material, placing the gasket material in the mold space, finishing the manhole insert gasket by curing the gasket material and removing the manhole insert from the gasket mold. Manhole inserts having a manhole insert gasket characterized by enhanced sealing capability and longevity are also disclosed.

15 Claims, 9 Drawing Sheets

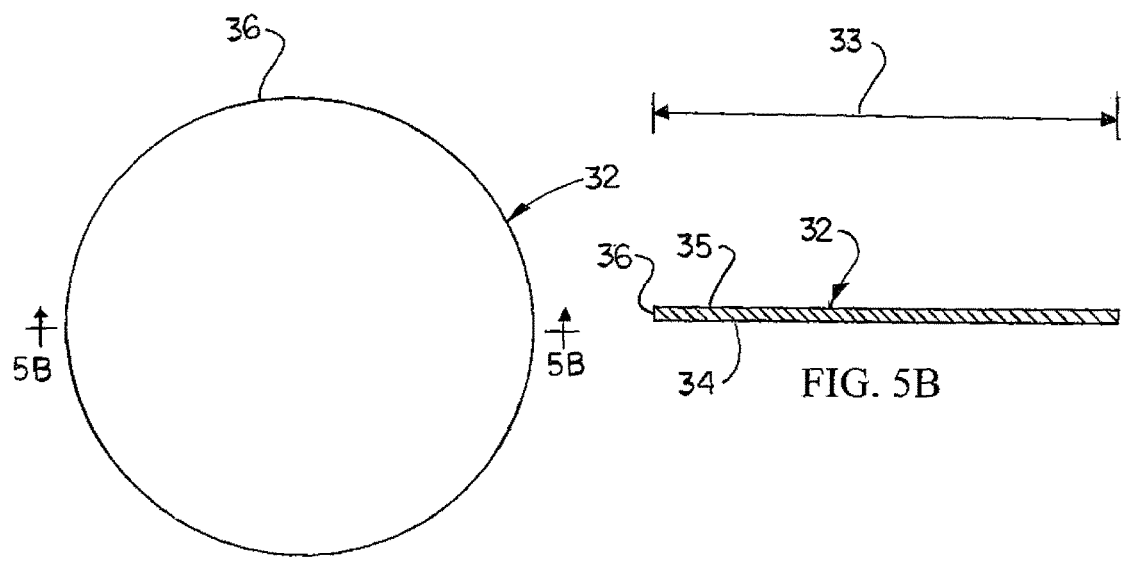
FIG. 5A
FIG. 5B
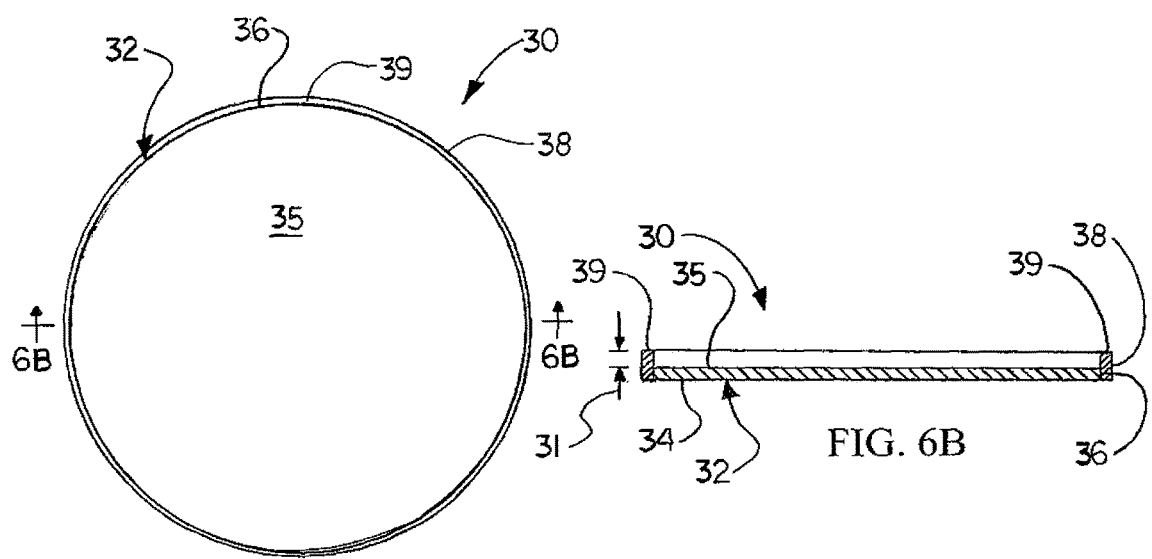
FIG. 6A
FIG. 6B

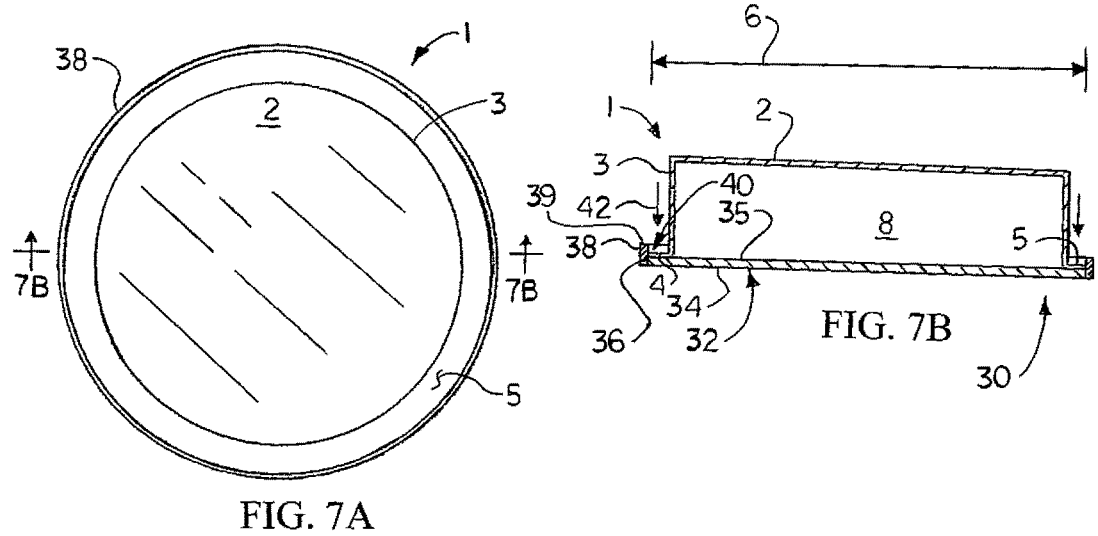
FIG. 7A
FIG. 7B
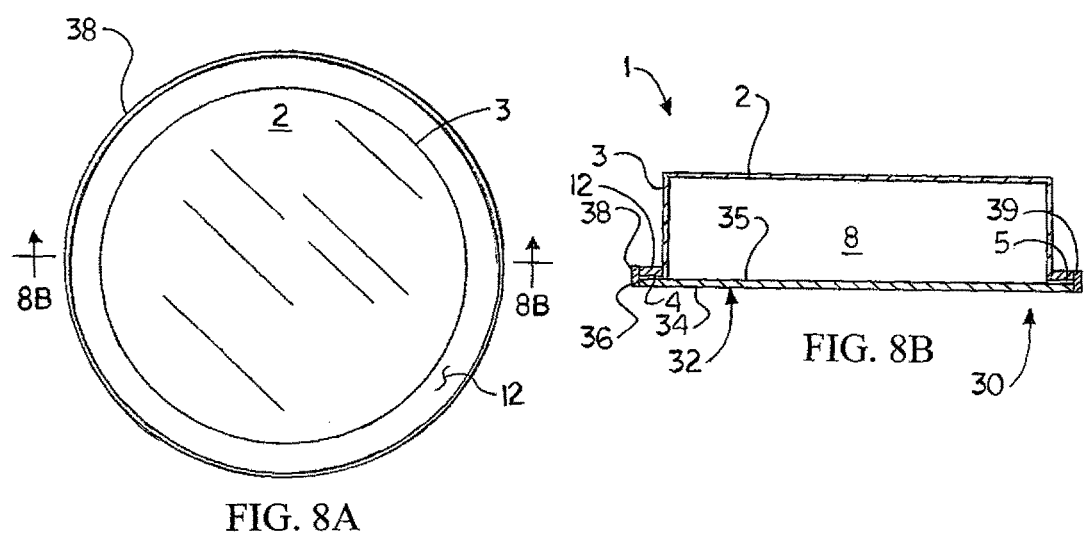
FIG. 8A
FIG. 8B

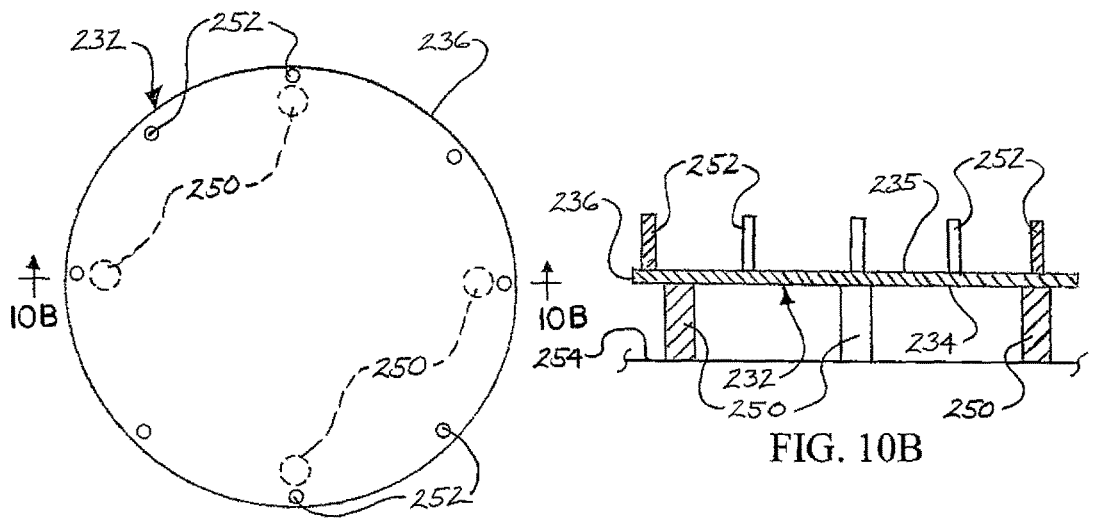
FIG. 10A
FIG. 10B
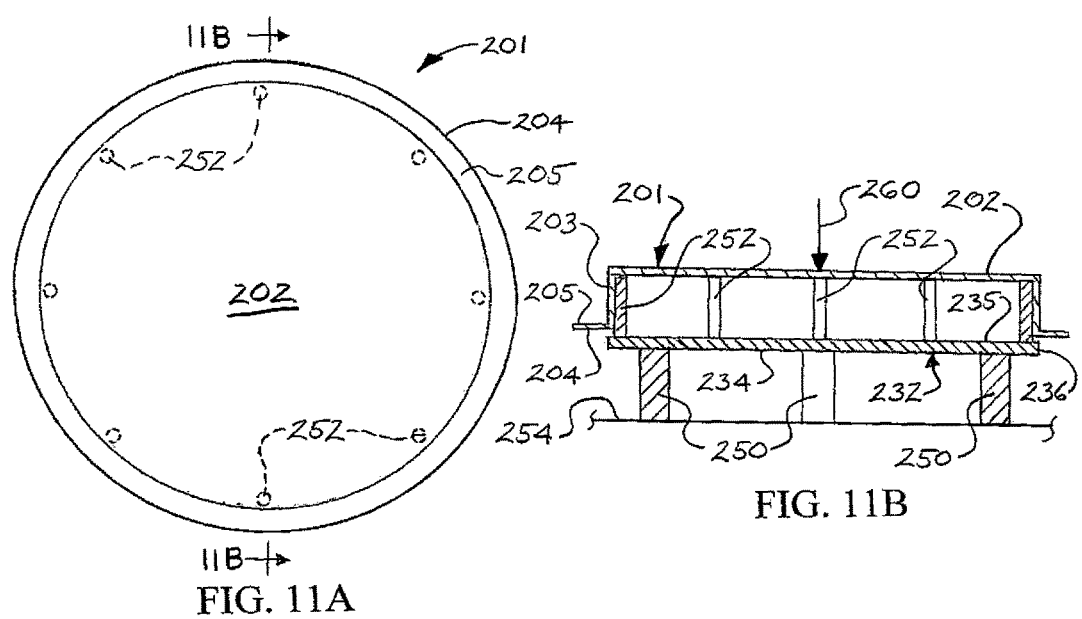
FIG. 11A
FIG. 11B

MANHOLE INSERTS AND MANHOLE INSERT GASKET FABRICATION METHODS

FIELD

Illustrative embodiments of the disclosure generally relate to manhole inserts for closing manholes which overlie subterranean sewer systems. More particularly, illustrative embodiments of the disclosure relate to manhole inserts having a manhole insert gasket characterized by enhanced sealing capability and longevity and methods of fabricating a manhole insert gasket on a manhole insert.

BACKGROUND

The background description provided herein is solely for the purpose of generally presenting the context of various illustrative embodiments of the disclosure. Aspects of the background description are neither expressly nor impliedly admitted as prior art against the claimed subject matter.

In sewer systems, manhole structures typically facilitate access to subterranean piping. A typical manhole structure may have a ring-shaped manhole structure frame which encloses a manhole. A manhole insert may be placed in the manhole structure frame to close the manhole and the underlying sewer system from rainwater and other precipitation. A removable manhole cover may be seated in the manhole structure frame to facilitate access to the manhole and the sewer system.

Manhole inserts having a manhole insert gasket characterized by enhanced sealing capability and longevity and methods of fabricating a manhole insert gasket on a manhole insert are needed.

SUMMARY

Illustrative embodiments of the disclosure are generally directed to methods of fabricating a manhole insert gasket on a manhole insert flange of a manhole insert. An illustrative embodiment of the methods includes fabricating a gasket mold, inverting a manhole insert having a manhole insert flange, placing the manhole insert on the gasket mold with a mold space overlying the manhole insert flange, preparing a gasket material, placing the gasket material in the mold space, finishing the manhole insert gasket by curing the gasket material and removing the manhole insert from the gasket mold.

Illustrative embodiments of the disclosure are further generally directed to manhole inserts. An illustrative embodiment of the manhole inserts includes a manhole insert bottom; a manhole insert sidewall extending from the manhole insert bottom; a manhole insert flange extending from the manhole insert sidewall; and a manhole insert gasket on the manhole insert flange. The manhole insert gasket includes a gasket material having a two-part polyurethane elastomer prepared by mixing a first part having poly[oxy(methyl-1,2-thanediyl)], alpha-hydro-omega-hydroxy-polymer with 1, 3-diisocyanato-2-methylbenzene and 2, 4-diisocyanato-1-methylbenzene; dipropylene glycol dibenzoate; and toluene 2,4-diisocyanate with a second part having polypropylene glycol, diethyltoluenediamine and neodecanoic acid, bismuth (3+) salt.

BRIEF DESCRIPTION OF THE DRAWINGS

Illustrative embodiments of the disclosure will now be described, by way of example, by reference to the accompanying drawings, in which:

FIG. 5A is a top view of a typical mold board prepared for fabrication of a gasket mold according to an illustrative embodiment of the manhole insert gasket fabrication methods;

FIG. 5B is a cross-sectional view taken along section lines 5B-5B in FIG. 5A;

FIG. 6A is a top view of a typical gasket mold with a mold wall extending from the mold board;

FIG. 6B is a cross-sectional view taken along section lines 6B-6B in FIG. 6A;

FIG. 7A is a top view of a manhole insert inverted and placed in the gasket mold preparatory to fabrication of the manhole insert gasket on the manhole insert;

FIG. 7B is a cross-sectional view taken along section lines 7B-7B in FIG. 7A, more particularly illustrating placement of a gasket material into a mold space which overlies a manhole insert flange of the manhole insert in fabrication of the manhole insert gasket;

FIG. 8A is a top view of the inverted manhole insert placed on the gasket mold with the gasket material cured to form the manhole insert gasket on the manhole insert flange of the manhole insert;

FIG. 8B is a cross-sectional view taken along section lines 8B-8B in FIG. 8A;

FIG. 10A is a top view of a typical mold board prepared for fabrication of a gasket mold according to an alternative illustrative embodiment of the manhole insert gasket fabrication methods;

FIG. 10B is a cross-sectional view taken along section lines 10B-10B in FIG. 10A;

FIG. 11A is a top view of a manhole insert inverted and placed on multiple, upward-standing manhole insert support members (not illustrated) extending from the mold board;

FIG. 11B is a cross-sectional view taken along section lines 11B-11B in FIG. 11A;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "upper" and "lower" are intended to be used in an illustrative and not a limiting sense. In some applications, therefore, those elements which are identified as "upper" may be located beneath those elements which are identified as "lower" in the following detailed description. For purposes of description herein, such relative terms relate to the position of the manhole insert as illustrated in FIG. 4.

Figure 1:
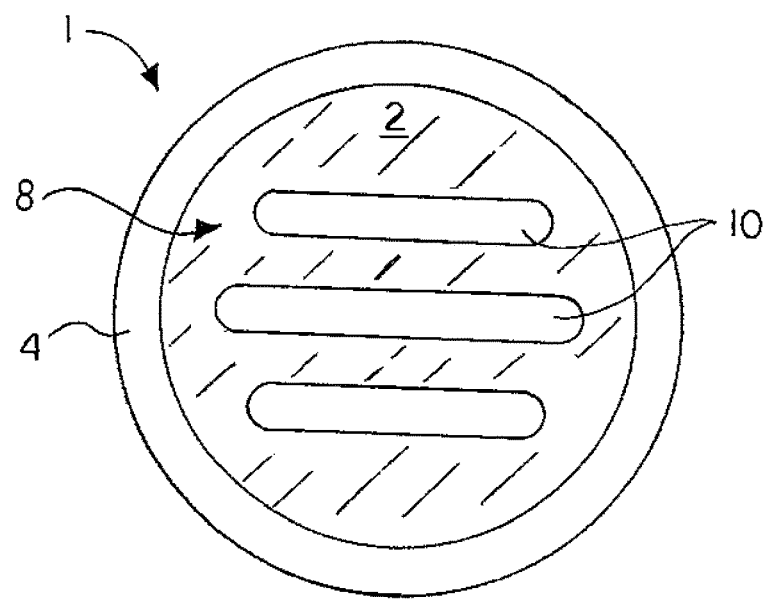
FIG. 1 is a top view of an illustrative embodiment of the manhole insert.
Figure 2:
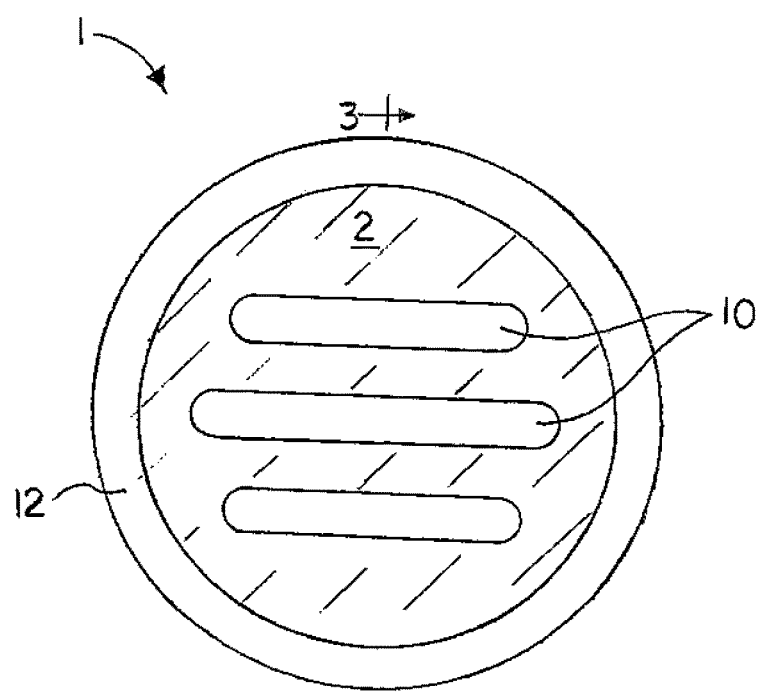
FIG. 2 is a bottom view of the illustrative manhole insert.
Figure 3:
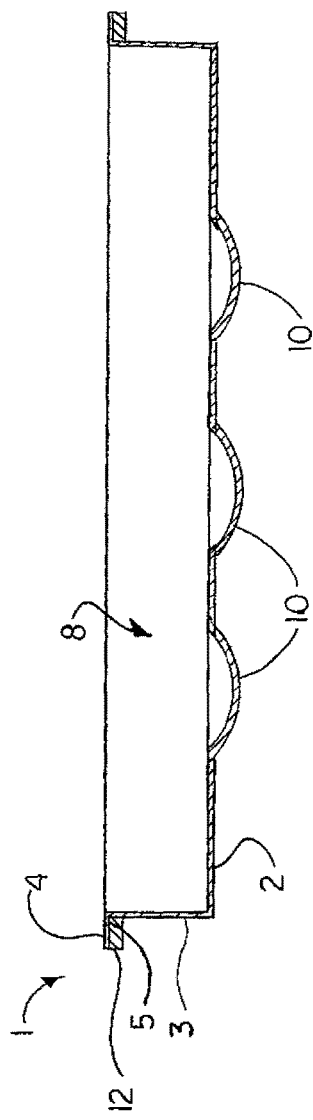
FIG. 3 is a cross-sectional view taken along section lines 3-3 in FIG. 2.
Figure 4:
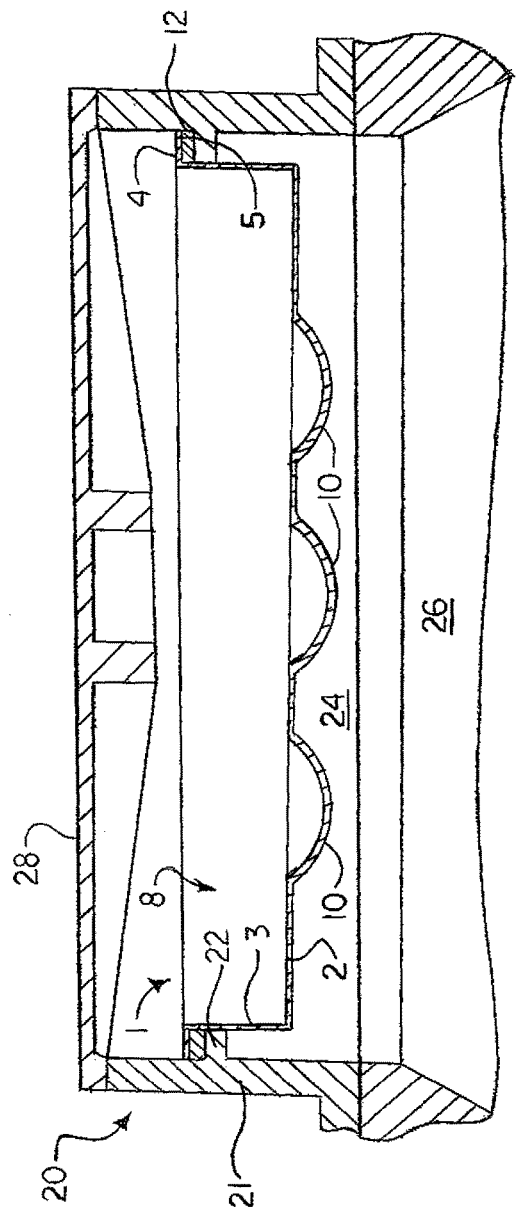
FIG. 4 is a cross-sectional view of the illustrative manhole insert, seated on a manhole structure shoulder inside a manhole structure frame in a manhole structure.

Referring initially to FIGS. 1-4 of the drawings, an illustrative embodiment of the manhole insert is generally indicated by reference numeral 1. As illustrated in FIG. 4 and will be hereinafter described, the manhole insert 1 is suitably designed and configured to be placed in a manhole opening 24 inside a manhole structure 20. The manhole structure 20 may include a manhole structure frame 21 which encloses the manhole opening 24 and overlies a typically subterranean sanitary sewer system 26. The manhole insert 1 may prevent rainwater and other precipitation and/or floodwater from flowing into the sewer system 26 and causing the sewer system 26 to overflow to a ground or roadway surface (not illustrated) through the manhole opening 24. The manhole insert 1 may be generally pan-shaped with a flat or planar manhole insert bottom 2. In some embodiments, multiple insert stiffeners 10 may be formed, shaped, stamped or otherwise provided in the manhole insert bottom 2. The manhole insert bottom 2 may be fitted with additional features (not illustrated) such as a pressure relief valve, lift handles and warning tags, for example and without limitation. A manhole insert sidewall 3 may extend upwardly from an outer edge of the manhole insert bottom 2. A manhole insert flange 4 may extend outwardly from the manhole insert sidewall 3. The manhole insert flange 4 may have a manhole insert flange bottom surface 5. As illustrated in FIGS. 3 and 4, a manhole insert interior 8 may be formed by and between the manhole insert bottom 2 and the manhole insert sidewall 3.

A manhole insert gasket 12 is provided on the manhole insert flange bottom surface 5 of the manhole insert flange 4. The manhole insert gasket 12 may be fabricated according to a process which will be hereinafter described. In some embodiments, the manhole insert gasket 12 may be fabricated of a gasket material which is prepared by mixing a two-part low viscosity polyurethane elastomer having high strength and elongation with excellent chemical resistance. The two-part polyurethane elastomer of the gasket material may include a mixture having a first part (Part A) including poly[oxy(methyl-1,2-thanediyl)], alpha-hydro-omega-hydroxy-polymer with 1, 3-diisocyanato-2-methylbenzene and 2, 4-diisocyanato-1-methylbenzene; dipropylene glycol dibenzoate; and toluene-2,4-diisocyanate; and a second part (Part B) including polypropylene glycol, diethyltoluenediamine and neodecanoic acid, bismuth (3+) salt.

In some embodiments, the poly[oxy(methyl-1,2-thanediyl)], alpha-hydro-omega-hydroxy-polymer with 1, 3-diisocyanato-2-methylbenzene and 2, 4-diisicyanato-1-methylbenzene may be present in Part A of the gasket material in a quantity of about 60-80% by weight. The dipropylene glycol dibenzoate may be present in Part A in a quantity of about 10-15% by weight. The toluene 2,4-diisocyanate may be present in Part A in a quantity of less than about 1% by weight.

In some embodiments, the polypropylene glycol may be present in Part B of the gasket material in a quantity of about 85-95% by weight. The diethyltoluenediamine may be present in Part B in a quantity of about 5-15% by weight. The neodecanoic acid, bismuth (3+) salt may be present in Part B in a quantity of less than about 1% by weight.

Typical properties of the manhole insert gasket 12 may be as follows:
Type: low viscosity polyurethane elastomer
Properties: high strength and elongation with excellent chemical resistance
Mix ratio: 1:1 by volume
Working Life: 30-45 minutes
Full cure @ 72° F.—24 hours
Specific Gravity Part A—1.10
Specific Gravity Part B—1.05
Weight per gallon mixed—8.96 lbs.
Cubic inch per lb. of product—25.78 ci/lb
Hardness, ASTM 2240-85 20-25 Shore A
Tear Strength, ASTM D-624 125 lb./in.
Tensile Strength, ASTM D-412 die C 550 psi
Elongation, ASTM D-412 die C 470%

A non-limiting example of a polyurethane elastomer gasket material which is suitable for fabrication of the manhole insert gasket 12 can be obtained from Pilgrim Permocoat, Inc. (www. pilgrimpermocoat.com).

As illustrated in FIG. 4, in typical application, the manhole insert 1 is placed in the manhole opening 24 with the manhole insert gasket 12 seated on the manhole shoulder 22 in the manhole structure frame 21 of the manhole structure 20. A manhole cover 28 may be placed on the manhole structure frame 21 to close the manhole opening 24 above the manhole insert 1. Accordingly, during heavy rain and other precipitation, the manhole insert 1 prevents rainwater and other precipitation and/or floodwater from entering the sewer system 26 through the manhole opening 24. This in turn, prevents the sewer system 26 from overflowing through the manhole opening 24 to the ground or roadway surface. The manhole insert gasket 12 imparts a liquid-tight seal between the manhole insert flange 4 and the underlying manhole structure shoulder 22 to prevent seepage of water and/or sewerage between the manhole insert flange 4 and the manhole shoulder 22. It will be appreciated by those skilled in the art that the manhole insert gasket 12 exhibits enhanced liquid sealing characteristics as well as enhanced longevity to prevent or reduce the necessity or frequency of replacing the manhole insert 1 or the manhole insert gasket 12 on the manhole insert flange 4.

Referring next to FIGS. 5A-8B, typical fabrication of the manhole insert gasket 12 (FIGS. 8A and 8B) on the manhole insert flange 4 is illustrated. As illustrated in FIGS. 5A and 5B, the method may begin with preparation of a mold board 32. In some embodiments, the mold board 32 may be circular in shape and cut from a sheet of particle board or thick plywood, for example and without limitation. As illustrated in FIG. 5B, the mold board 32 has a mold board outer diameter 33 which substantially matches or corresponds to an outer insert flange diameter 6 (FIG. 7B) of the manhole insert flange 4 on the manhole insert 1. The mold board 32 may have an outer mold board surface 34 and an inner mold board surface 35 which are circumscribed by an outer mold board edge 36.

As illustrated in FIGS. 6A and 6B, a gasket mold 30 may be fabricated by attachment of a mold wall 38 to the outer mold board edge 36 of the mold board 32. As illustrated in FIG. 6B, the mold wall 38 may protrude beyond the inner mold board surface 35 to form a gasket mold depth 31 which corresponds to the distance between the inner mold board surface 35 of the mold board 32 and a mold wall rim 39 on the mold wall 38. In some embodiments, the gasket mold depth 31 may be about ⅛ of an inch. In other embodiments, the gasket mold depth 31 may be greater or less than ⅛ inch. In some embodiments, the mold wall 38 may be fabricated of HDPE (high density polyethylene). The mold wall 38 may be cut or stamped as an elongated strip from a sheet (not illustrated) of the HDPE or other material. Accordingly, the mold wall 38 may have a length which substantially corresponds to a circumference of the manhole insert flange 4. The mold wall 38 may be attached to the outer mold board edge 36 of the mold board 32 using wood screws and washers (not illustrated) and/or using glue, adhesive, other mechanical fasteners and/or alternative attachment techniques known by those skilled in the art. In some embodiments, the mold board 32 and the mold wall 38 may be fabricated in one piece using casting, molding and/or other suitable fabrication techniques known by those skilled in the art.

The mold board 32 of the gasket mold 30 may be placed on a flat surface (not illustrated). As illustrated in FIGS. 7A and 7B, the manhole insert 1 is next inverted and the manhole insert flange 4 placed on the inner mold board surface 35 of the mold board 32 with the outer edge of the manhole insert flange 4 engaging the interior surface of the mold wall 38. An annular mold space 40 may be formed by and between the manhole insert flange 4 and the mold wall 38. In some embodiments, a weight (not illustrated) may be placed on the manhole insert 1 to weight the manhole insert flange 4 against the mold board 32.

As further illustrated in FIG. 7B, a gasket material 42 is prepared and poured or otherwise placed into the mold space 40. As noted above, in some embodiments, the manhole insert gasket 12 may be fabricated of a gasket material 42 which is prepared by mixing a two-part low viscosity polyurethane elastomer. The two-part polyurethane elastomer of the gasket material 42 may include a mixture having a first part (Part A) including poly[oxy(methyl-1,2-thanediyl)], alpha-hydro-omega-hydroxy-polymer with 1,3-diisocyanato-2-methylbenzene and 2,4-diisicyanato-1-methylbenzene; dipropylene glycol dibenzoate; and toluene 2,4-diisocyanate; and a second part (Part B) including polypropylene glycol, diethyltoluenediamine and neodecanoic acid, bismuth (3+) salt.

In some embodiments, the poly[oxy(methyl-1,2-thanediyl)], alpha-hydro-omega-hydroxy-polymer with 1,3-diisocyanato-2-methylbenzene and 2,4-diisocyanato-1-methylbenzene may be present in Part A of the gasket material 42 in a quantity of about 60-80% by weight. The dipropylene glycol dibenzoate may be present in Part A in a quantity of about 10-15% by weight. The toluene 2,4-diisocyanate may be present in the Part A in a quantity of less than about 1% by weight.

In some embodiments, the polypropylene glycol may be present in Part B of the gasket material 42 in a quantity of about 85-95% by weight. The diethyltoluenediamine may be present in Part B in a quantity of about 5-15% by weight. The neodecanoic acid, bismuth (3+) salt may be present in Part B in a quantity of less than about 1% by weight.

The gasket material 42 may be prepared by mixing a substantially 1:1 volume ratio of Parts A and B. After it is poured or otherwise placed into the mold space 40, the gasket material 42 may be leveled off to render it flush with the mold wall rim 39 of the mold wall 38. Thus, the depth of the gasket material 42 may substantially correspond to the gasket mold depth 31 (FIG. 6B) of the gasket mold 30.

In some applications, talcum powder or the like (not illustrated) may be applied to the surface of the gasket material 42 to neutralize stickiness on the manhole insert gasket 12 after the gasket material 42 cures. After the gasket material 42 cures to form the manhole insert gasket 12, the manhole insert 1 may next be removed from the gasket mold 30 with the manhole insert gasket 12 adhering to the manhole insert flange bottom surface 5 of the manhole insert flange 4, as illustrated in FIGS. 8A and 8B. The manhole insert gasket 12 may be trimmed to remove excess material and substantially conform the outer diameter of the manhole insert gasket 12 to the outer insert flange diameter 6 (FIG. 7B) of the manhole insert flange 4. The manhole insert 1 may then be deployed in the manhole opening 24 (FIG. 4) of the manhole structure 20, as was heretofore described.

Figure 9:
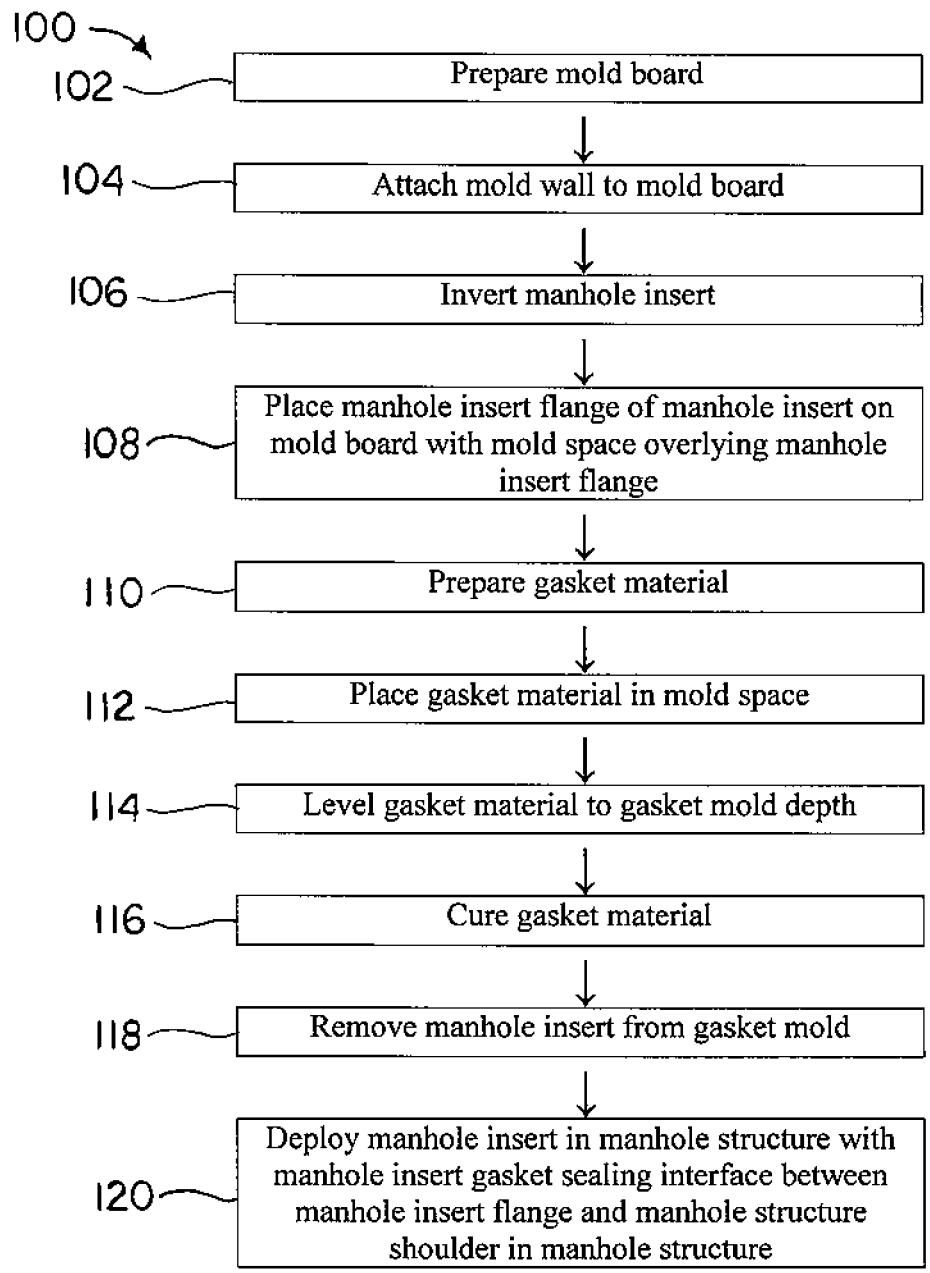
FIG. 9 is a flow diagram which illustrates an illustrative embodiment of the manhole insert gasket fabrication method.

Referring next to FIG. 9 of the drawings, an illustrative embodiment of a manhole insert gasket fabrication method is illustrated. At block 102, a gasket mold may be fabricated by initially preparing a mold board. At block 104, a mold wall may be attached to the mold board. In other embodiments, the mold board and the mold wall of the gasket mold may be fabricated in one piece according to the knowledge of those skilled in the art. At block 106, a manhole insert is inverted. At block 108, the manhole insert flange of the manhole insert is placed on the mold board with a mold space overlying the manhole insert flange. At block 110, a gasket material is prepared. At block 112, the gasket material is poured or otherwise placed in the mold space. At block 114, the poured gasket material may be leveled to the mold wall rim of the mold wall. At block 116, the gasket material is cured. At block 118, the manhole insert is removed from the gasket mold. At block 120, the manhole insert is deployed in a manhole structure with the manhole insert gasket sealing the interface between the manhole insert flange and the manhole structure shoulder in the manhole structure.

Referring next to FIGS. 10A-13B of the drawings, typical fabrication of the manhole insert gasket 212 (FIGS. 13A and 13B) on the manhole insert flange 204 according to an alternative illustrative embodiment of the manhole insert gasket fabrication methods is illustrated. The reference numerals 201-299 in FIGS. 10A-13B designate like elements to those designated by reference numerals 1-99, respectively, in the method which was heretofore described with respect to FIGS. 5A-8B. As illustrated in FIGS. 10A and 10B, the method may begin with preparation of a mold board 232 as an initial step in fabrication of a gasket mold 230 (FIGS. 12A and 12B). In some embodiments, the mold board 232 may be circular in shape and cut from a sheet of particle board or thick plywood, for example and without limitation.

At least one mold board support member 250 may extend downwardly from the outer mold board surface 234 of the mold board 232. The mold board support member or members 250 may have any structure or design which is suitable for the purpose of supporting the mold board 232 in a substantially horizontal, level position above a flat, level support surface 254. In some embodiments, multiple mold board support members 250 of substantially equal length may extend downwardly from the outer mold board surface 234 of the mold board 232. The mold board support members 250 may rest on the support surface 254 and support the mold board 232 in a substantially horizontal, level position above the support surface 254. The mold board support members 250 may be attached to the mold board 232 according to any suitable technique which is known by those skilled in the art. For example and without limitation, in some embodiments, the mold board support members 250 may be attached to the mold board 232 using glue, screws and/or other mechanical fasteners (not illustrated). In some embodiments, the mold board support members 250 may be fabricated in one piece with the mold board 232 using casting, molding and/or other fabrication techniques known by those skilled in the art. In some embodiments, the mold board support members 250 may include dowel pins and may have a length of about 2 inches.

At least one manhole insert support member 252 may extend upwardly from the inner mold board surface 235 of the mold board 232. The manhole insert support member or members 252 may have any structure or design which is suitable for the purpose of supporting a manhole insert 201 in an inverted position in a substantially horizontal, level position above the support surface 254. In some embodiments, multiple manhole insert support members 252 of substantially equal length may extend upwardly from the inner mold board surface 235 of the mold board 232. The manhole insert support members 252 may be attached to the mold board 232 according to any suitable technique which is known by those skilled in the art. For example and without limitation, in some embodiments, the manhole insert support members 252 may be attached to the mold board 232 using glue, screws and/or other mechanical fasteners (not illustrated). In some embodiments, the manhole insert support members 252 may be fabricated in one piece with the mold board 232 using casting, molding and/or other fabrication techniques known by those skilled in the art. In some embodiments, the manhole insert support members 252 may include dowel pins and may have a length of about 1 inch.

The mold board support members 250 are placed on the support surface 254 and support the mold board 232 in a generally level, horizontal position, with the manhole insert support members 252 extending upwardly from the outer mold board surface 235 of the mold board 232. As illustrated in FIGS. 11A and 11B, the manhole insert 201 may next be inverted and placed on the upward-standing manhole insert support members 252 with the manhole insert flange 204 of the manhole insert 201 extending outwardly from the manhole insert support members 252. Downward pressure 260 (FIG. 11B) may be applied to one or more areas on the manhole insert bottom 202 of the manhole insert 201 until the manhole insert 201 is substantially level or horizontal. In some embodiments, the downward pressure 260 may be applied by placing one or more weights (not illustrated) on the manhole insert bottom 202.

Figure 12A:
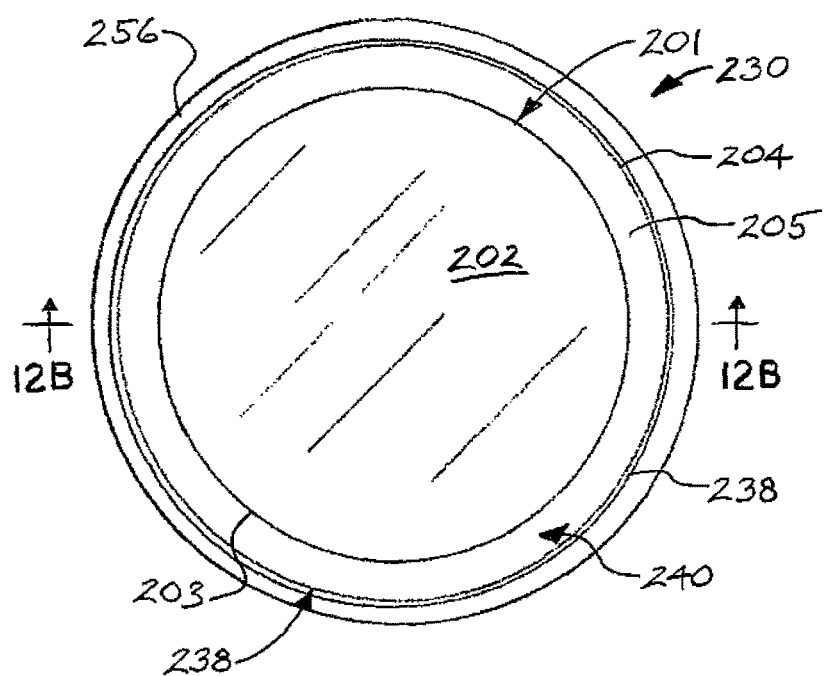
FIG. 12A is a top view of the inverted manhole insert placed on the manhole insert support members (not illustrated) and a mold wall clamp fastened around the mold wall to form the gasket mold preparatory to fabrication of the manhole insert gasket on the manhole insert.
Figure 12B:
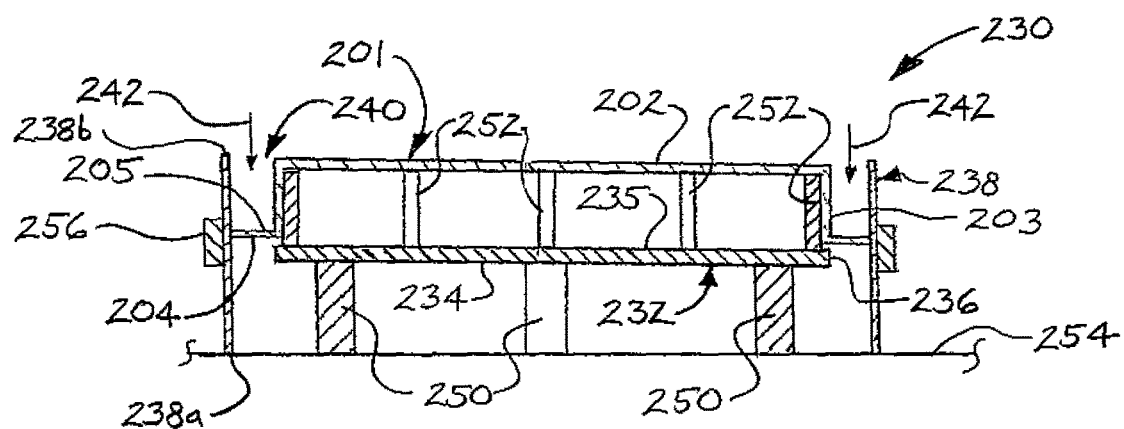
FIG. 12B is a cross-sectional view taken along section lines 12B-12B in FIG. 12A, more particularly illustrating placement of a gasket material into a mold space which overlies a manhole insert flange of the manhole insert in fabrication of the manhole insert gasket.

As illustrated in FIGS. 12A and 12B, fabrication of the gasket mold 230 may be completed by attachment of a mold wall 238 to the outer edge of the manhole insert flange 204. In some embodiments, the mold wall 238 may be fabricated of HDPE (high density polyethylene). The mold wall 238 may be cut or stamped as an elongated strip from a sheet (not illustrated) of the HDPE or other material. Accordingly, the mold wall 238 may have a length which substantially corresponds to a circumference of the manhole insert flange 204. As illustrated in FIG. 12B, the mold wall 238 may have a lower mold wall edge 238a which rests on the support surface 254 and an upper mold wall edge 238b which protrudes beyond the upward-facing manhole insert flange bottom surface 205 of the manhole insert flange 204 on the inverted manhole insert 201.

The mold wall 238 may be applied to the manhole insert flange 204 of the manhole insert 201 in sealing relationship thereto using any attachment or securing technique which is suitable for the purpose. For example and without limitation, in some embodiments, a mold wall securing mechanism 256 may be applied to the outer surface of the mold wall 238 and then secured to hold the mold wall 238 against the outer edge of the manhole insert flange 204. In some embodiments, the mold wall securing mechanism 256 may include a standard or conventional tie-down strap fitted with a securing strap buckle (not illustrated). An annular mold space 240 may be formed by and between an exterior surface of the manhole insert side wall 203 of the manhole insert 201 and an interior surface of the mold wall 238. As illustrated in FIG. 12B, the mold space 240 may overlie the manhole insert flange bottom surface 205 of the manhole insert flange 204.

As further illustrated in FIG. 12B, a gasket material 242 is prepared and poured or otherwise placed into the mold space 240. The gasket material 242 may have the same compositions and may be prepared according to the same methods as those which were heretofore described with respect to the gasket material 42 in FIG. 7B.

Figure 13A:
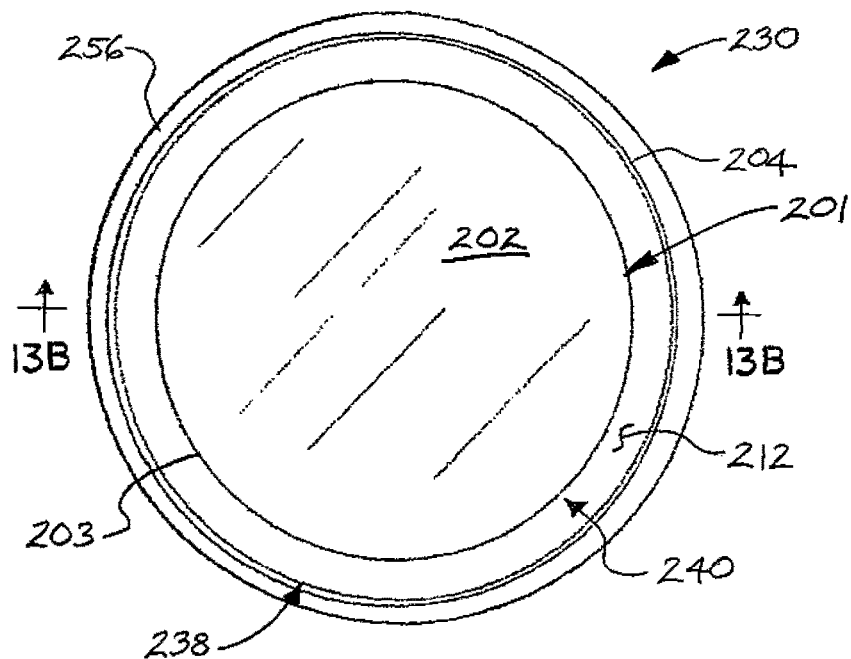
FIG. 13A is a top view of the inverted manhole insert with the gasket material cured to form the manhole insert gasket on the manhole insert flange of the manhole insert.
Figure 13B:
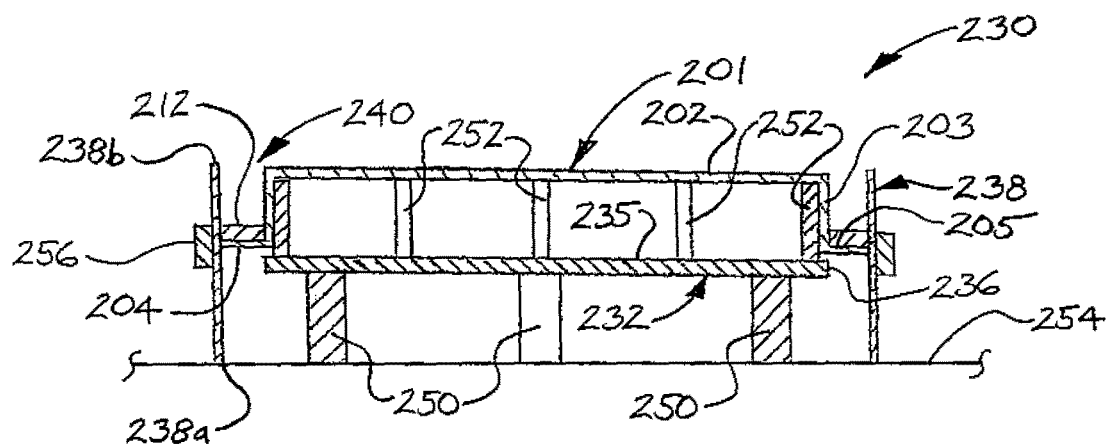
FIG. 13B is a cross-sectional view taken along section lines 13B-13B in FIG. 13A.

As illustrated in FIGS. 13A and 13B, the gasket material 242 (FIG. 12B) cures and forms a manhole insert gasket 212 which may include a polyurethane elastomer in some embodiments. In some embodiments, a sufficient quantity of gasket material 242 may be placed in the mold space 240 to form a manhole insert gasket 212 having a thickness of about ⅛ inch. In other embodiments, the manhole insert gasket 212 may have a thickness of greater than or less than ⅛ inch.

After the gasket material 242 cures to form the manhole insert gasket 212, the gasket mold 230 may be disassembled by unfastening the mold wall securing mechanism 256 and removing the mold wall 238 from the manhole insert flange 204. The manhole insert 201 may then be lifted from the upward-standing manhole insert support members 252 of the gasket mold 230, with the manhole insert gasket 212 adhering to the manhole insert flange bottom surface 205 of the manhole insert flange 204. Talcum powder or the like (not illustrated) may be applied to the manhole insert gasket to neutralize stickiness. The manhole insert gasket 212 may be trimmed to remove excess material and substantially conform the outer diameter of the manhole insert gasket 212 to the outer insert flange diameter 6 (FIG. 7B) of the manhole insert flange 204. The manhole insert 201 may then be deployed in the manhole opening 24 (FIG. 4) of the manhole structure 20, as was heretofore described with respect to deployment of the manhole insert 1.

Figure 14:
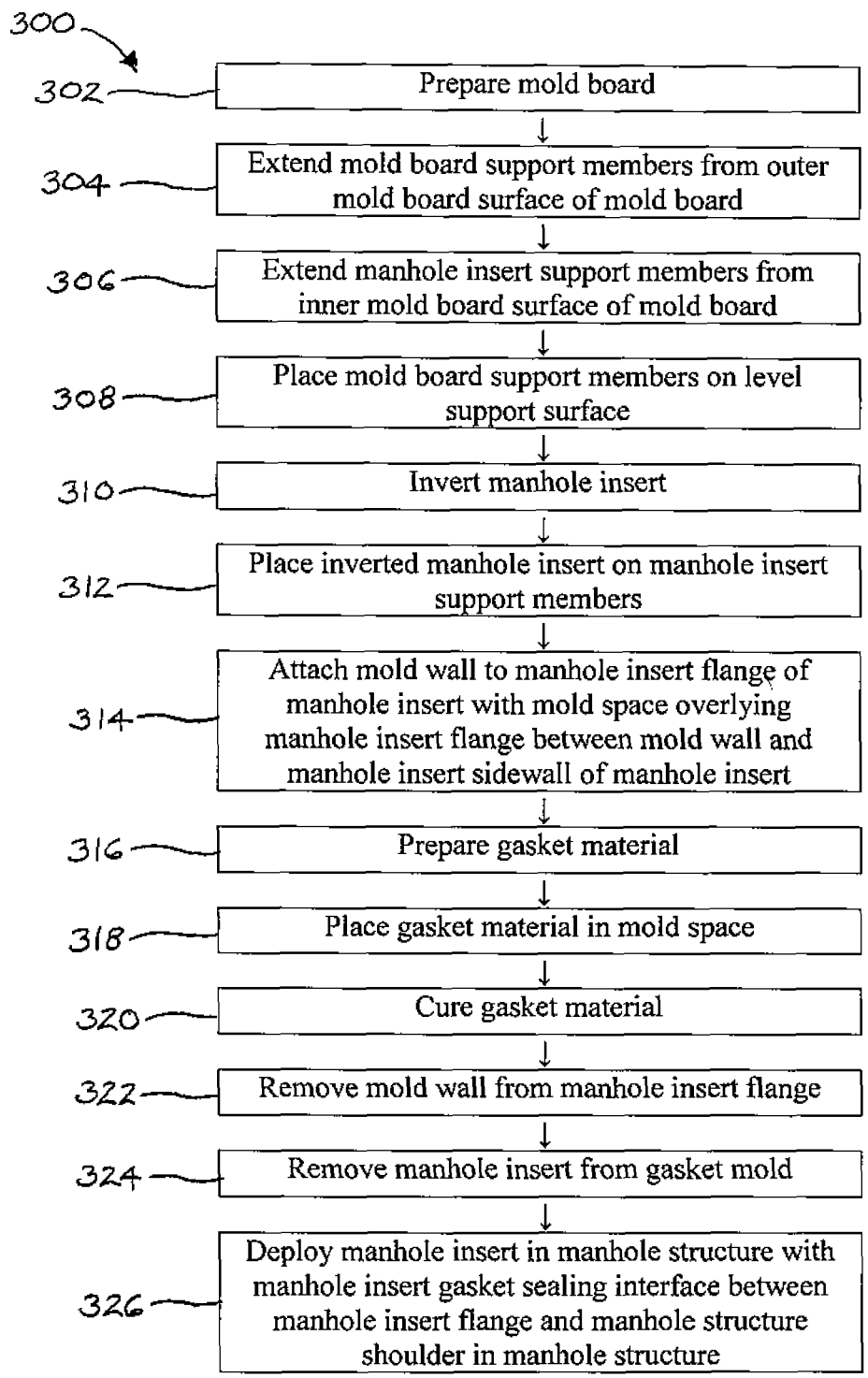
FIG. 14 is a flow diagram which illustrates an alternative illustrative embodiment of the manhole insert gasket fabrication method.

Referring next to FIG. 14 of the drawings, an alternative illustrative embodiment of a manhole insert gasket fabrication method is generally indicated by reference numeral 300. At block 302, a gasket mold may be fabricated by initially preparing a mold board. At block 304, multiple mold board support members are extended from the outer mold board surface of the mold board. At block 306, multiple manhole insert support members are extended from the inner mold board surface of the mold board. At block 308, the mold board support members are placed on a level support surface to deploy the mold board in a substantially level position above the support surface.

At block 310, a manhole insert is inverted. At block 312, the inverted manhole insert is placed on the manhole insert support members. Downward pressure may be applied to one or more areas on the manhole insert to substantially level the manhole insert, as deemed necessary. At block 314, a mold wall is attached to the manhole insert flange of the manhole insert to form a gasket mold, with a mold space overlying the manhole insert flange between the mold wall and the manhole insert sidewall of the manhole insert.

At block 316, a gasket material is prepared. At block 318, the gasket material is poured or otherwise placed in the mold space. At block 320, the gasket material is cured to form the manhole insert gasket. At block 322, the mold wall is removed from the manhole insert flange. At block 324, the manhole insert is removed from the gasket mold. Talcum powder or the like (not illustrated) may be applied to the manhole insert gasket to neutralize stickiness. At block 326, the manhole insert is deployed in a manhole structure with the manhole insert gasket sealing the interface between the manhole insert flange and the manhole structure shoulder in the manhole structure.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A method of fabricating an elastomer manhole insert gasket on a manhole insert flange of a manhole insert for placement in a manhole opening on a manhole shoulder of a manhole structure beneath a manhole cover, comprising:
   fabricating a gasket mold;
   inverting a manhole insert having a manhole insert flange;
   placing the manhole insert on the gasket mold with a mold space overlying the manhole insert flange;
   preparing a gasket material;
   placing the gasket material in the mold space;
   finishing the elastomer manhole insert gasket by curing the gasket material; and
   removing the manhole insert from the gasket mold.

2. The method of claim 1 wherein fabricating a gasket mold comprises preparing a mold board and attaching a mold wall to the mold board, and wherein placing the manhole insert on the gasket mold comprises placing the manhole insert flange of the manhole insert on the mold board and against the mold wall.

3. The method of claim 1 wherein preparing a gasket material comprises preparing a gasket material comprising a polyurethane elastomer.

4. The method of claim 3 wherein preparing a gasket material comprising a polyurethane elastomer comprises preparing a gasket material comprising a two-part polyurethane elastomer.

5. The method of claim 4 wherein preparing a gasket material comprising a two-part polyurethane elastomer comprises preparing a gasket material including mixing a first part having poly[oxy(methyl-1,2-thanediyl)], alpha-hydro-omega-hydroxy-polymer with 1, 3-diisocyanato-2-methylbenzene and 2, 4-diisocyanato-1-methylbenzene; dipropylene glycol dibenzoate; and toluene 2,4-diisocyanate with a second part having polypropylene glycol, diethyltoluenediamine and neodecanoic acid, bismuth (3+) salt.

6. The method of claim 5 wherein preparing a gasket material comprises preparing a gasket material having poly[oxy(methyl-1,2-thanediyl)], alpha-hydro-omega-hydroxy-polymer with 1, 3-diisocyanato-2-methylbenzene and 2, 4-diisocyanato-1-methylbenzene in a quantity of about 60-80% by weight in the first part; dipropylene glycol dibenzoate in a quantity of about 10-15% by weight in the first part; and toluene 2,4-diisocyanate in a quantity of less than about 1% by weight in the first part.

7. The method of claim 6 wherein preparing a gasket material comprises preparing a gasket material having polypropylene glycol in a quantity of about 85-95% by weight in the second part; diethyltoluenediamine in a quantity of about 5-15% in the second part; and neodecanoic acid, bismuth (3+) salt in a quantity of less than about 1% by weight in the second part.

8. The method of claim 1 wherein fabricating a gasket mold comprises preparing a mold board having an outer mold board surface and an inner mold board surface, extending at least one mold board support member from the outer mold board surface, extending at least one manhole insert support member from the inner mold board surface and securing a mold wall against the manhole insert flange of the manhole insert with the mold space overlying the manhole insert flange between the manhole insert and the mold wall, and further comprising placing the at least one mold board support member on a flat, level support surface, and wherein placing the manhole insert on the gasket mold comprises placing the manhole insert on the at least one manhole insert support member.

9. A method of fabricating an elastomer manhole insert gasket on a manhole insert flange of a manhole insert for placement in a manhole opening on a manhole shoulder of a manhole structure beneath a manhole cover, comprising:
   initializing fabrication of a gasket mold by preparing a mold board having an outer mold board surface and an inner mold board surface, extending a plurality of mold board support members from the outer mold board surface, extending a plurality of manhole insert support members from the inner mold board surface and placing the plurality of mold board support members on a flat, level support surface;
   inverting a manhole insert having a flat or planar manhole insert bottom, a manhole insert sidewall extending from an outer edge of the manhole insert bottom and a manhole insert flange extending outwardly from the manhole insert sidewall;
   placing the manhole insert on the plurality of manhole insert support members;
   completing fabrication of the gasket mold by securing a mold wall against the manhole insert flange of the manhole insert with a mold space overlying the manhole insert flange between the manhole insert and the mold wall;
   preparing a gasket material;
   placing the gasket material in the mold space;
   finishing the elastomer manhole insert gasket by curing the gasket material; and
   removing the manhole insert from the gasket mold.

10. The method of claim 9 wherein preparing a gasket material comprises preparing a gasket material comprising a polyurethane elastomer.

11. The method of claim 10 wherein preparing a gasket material comprising a polyurethane elastomer comprises preparing a gasket material comprising a two-part polyurethane elastomer.

12. The method of claim 11 wherein preparing a gasket material comprising a two-part polyurethane elastomer comprises preparing a gasket material including a first part having poly[oxy(methyl-1,2-thanediyl)], alpha-hydro-omega-hydroxy-polymer with 1, 3-diisocyanato-2-methyl-benzene and 2, 4-diisocyanato-1-methylbenzene; dipropylene glycol dibenzoate; and toluene 2,4-diisocyanate; and a second part having polypropylene glycol, diethyltoluenediamine and neodecanoic acid, bismuth (3+) salt.

13. The method of claim 12 wherein preparing a gasket material comprises preparing a gasket material having poly[oxy(methyl-1,2-thanediyl)], alpha-hydro-omega-hydroxy-polymer with 1, 3-diisocyanato-2-methylbenzene and 2, 4-diisocyanato-1-methylbenzene in a quantity of about 60-80% by weight in the first part; dipropylene glycol dibenzoate in a quantity of about 10-15% by weight in the first part; and toluene 2,4-diisocyanate in a quantity of less than about 1% by weight in the first part.

14. The method of claim 13 wherein preparing a gasket material comprises preparing a gasket material comprises preparing a gasket material having polypropylene glycol a quantity of about 85-95% by weight in the second part; diethyltoluenediamine in a quantity of about 5-15% by weight in the second part; and neodecanoic acid, bismuth (3+) salt in a quantity of less than about 1 by weight in the second part.

15. The method of claim 9 further comprising deploying the manhole insert in a manhole structure with the manhole insert gasket sealing an interface between the manhole insert flange and a manhole structure shoulder in the manhole structure.

\* \* \* \* \*